United States Patent [19]
Schmid et al.

[11] Patent Number: 5,842,462
[45] Date of Patent: Dec. 1, 1998

[54] METHOD AND APPARATUS TO PRODUCE A RADIAL CUT PROFILE

[75] Inventors: Frederick Schmid, Marblehead; Maynard B. Smith, Amesbury, both of Mass.

[73] Assignee: Crystal Systems, Inc., Salem, Mass.

[21] Appl. No.: 959,545

[22] Filed: Oct. 24, 1997

Related U.S. Application Data

[63] Continuation of Ser. No. 672,734, Jun. 28, 1996, abandoned.

[51] Int. Cl.⁶ ..................................................... B28D 1/02
[52] U.S. Cl. ........................................ 125/16.02; 125/21
[58] Field of Search .............................. 125/16.02, 16.01, 125/21; 83/651.1

[56] References Cited

U.S. PATENT DOCUMENTS

| | | | |
|---|---|---|---|
| 4,646,710 | 3/1987 | Schmid et al. | 125/16.01 |
| 4,727,852 | 3/1988 | Schmid et al. | 125/16.01 |
| 5,080,085 | 1/1992 | Lovato | 125/16.01 |
| 5,201,305 | 4/1993 | Takeuchi | 125/16.01 |
| 5,735,258 | 4/1998 | Okuno et al. | 125/16.02 |

*Primary Examiner*—Robert A. Rose
*Attorney, Agent, or Firm*—Hale and Dorr LLP

[57] ABSTRACT

A radial cut profile is achieved while advancing a workpiece at a substantially constant rate in a direction towards a cutting blade by moving the workpiece vertically relative to the blade in synchronization with the oscillation of the workpiece. The vertical movement is provided by a linkage including two links pivotally connected to each other. The other end of one link is pivotally connected to the feed mechanism. The other end of the other link is fixed relative to the oscillating workpiece.

13 Claims, 5 Drawing Sheets

METHOD AND APPARATUS TO PRODUCE A RADIAL CUT PROFILE

This application is a continuation of application Ser. No. 08/672,634, filed Jul. 28, 1996, now abandoned.

FIELD OF THE INVENTION

This invention relates to the slicing of crystals and other materials into wafers and, more particularly, to systems using reciprocating wire blades.

BACKGROUND OF THE INVENTION

In slicing wafers from workpieces, (e.g., gallium arsenide, silicon, sapphire, silicon carbide, cadmium telluride, germanium), it is desirable to provide a radial cut profile between the blade(s) used to accomplish the slicing and the workpiece, and thus to reduce the length of the cutting blade(s) that is in contact with the workpiece. It is also desirable to provide for a relatively constant feed force between the blade(s) and the workpiece.

U.S. Pat. Nos. 4,646,710 and 4,727,852, which are hereby incorporated by reference, disclose a system which provides significant benefits over previously slicing procedures. In the system of that patent, a wafering machine has a multi­plicity of taut wire cutting blades strung on a bladehead that reciprocally moves past a workpiece. The workpiece is supported by a holder that rocks about an axis perpendicular to the wire blades at a frequency that is less than the frequency of reciprocation of the bladehead. Guide rollers are placed near, and on opposite sides of, the workpiece to reduce the unsupported lengths of the blades.

As taught in the aforementioned '710 and '852 patents, the slicing effectiveness increases rapidly when the contact length decrease between a workpiece being cut and the wire blade used to accomplish the slicing. Decreasing the contact length while maintaining a constant feed force causes the pressure between the diamond and the work to increase and thereby to cut more effectively in this reciprocating slicing mode.

As disclosed in the aforementioned patents, the contact length is decreased, and a radial cut profile achieved, by rocking the workpiece. The radius of curvature R of the profile is a function of the size and geometry of the work­piece and the rocking angle. The prior patent also discloses that the radius R of the cut profile becomes larger as the angle through which the workpiece is rocked during cutting is decreased, and that this results in an undesirable increase in the contact length between the wire blade and the cut profile.

Figure 1:
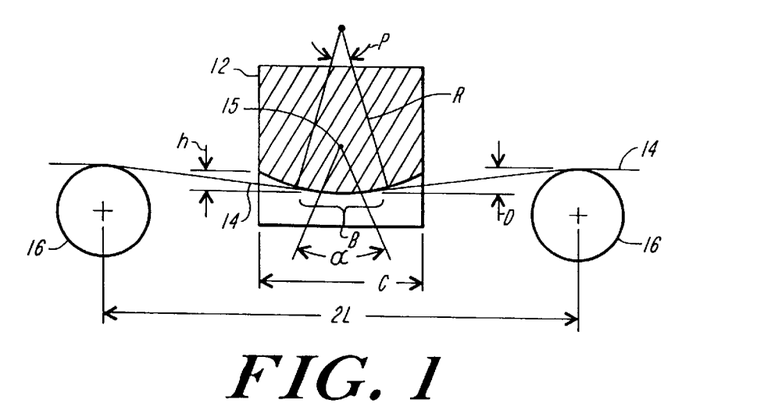
FIG. 1 is a schematic illustrating geometrical aspects of a wire blade cutting system.

The geometry is illustrated in FIG. 1. As there shown, the contact length between the wire blade 14 and the workpiece 12 is determined by the deflection D of wire blade 14 (i.e., the distance that the portion of the blade in contact with the workpiece is displaced downwardly from the plane defined by contact rollers 16) and the shape (i.e., the radius R) of the cut profile 13. The deflection of the wire is in turn dependent upon the properties of the wire, the downward force exerted by the workpiece, and the supported length (2L) of the wire between guide rollers 16. The radius of curvature of the cut profile 13 is in turn dependent on the rocking angle of the workpiece 12 and the location of the rocking axis 15.

Assuming that the shape of the cut profile 13 is an arc of radius R and that the contact length between the blade and the workpiece B subtends an angle P (in degrees) at the center, then $$B = P(2\pi R)/360 = PR/57.296.$$

P is equal to twice the angle of deflection of the wire at the point of contact of the guide wire, or $$P = 2\tan^{-1}(D/L)$$

where L is half the unsupported length of wires between guide rollers 16.

For effective cutting, R should be less than or equal to 28.648 B tan D/L. In the case of a workpiece having a rectangular cross-section, $R = c^2 + 4h^2/8h$ where c is the width of workpiece, and h is the distance from the cut profile to a line passing through the junctions of the cut profile with the sides of the ingot.

It has been found that, when wafers are cut from a workpiece as taught in the prior patents, i.e., with the workpiece being forced up against the wire blade(s), surface tension between wafers causes adjacent wafers to be drawn together after cutting only a short distance into the work­piece. This causes undesirable wear on the sides of the wafer.

It has also been found that, using the feed system of the prior patents, it was difficult to minimize force variations particularly on reversals motion of the feed mechanism.

Accordingly, it is desirable to provide a system that improves on, while retaining the advantages, of the system of the above prior patent.

SUMMARY OF THE INVENTION

Accordingly, one aspect of the present invention features an improved slicing machine in which sticking together of the wafers is prevented by moving an oscillating workpiece downwardly, rather than upwardly, so the space between wafers can be continuously subjecting the region being cut to a liquid coolant. In a second aspect, the desired radial cut profile is achieved while advancing the workpiece at a substantially constant rate in a direction towards the cutting blade(s) by driving the workpiece vertically relative to the blade(s) in synchronization with the oscillation of the work­piece; workpiece movement in a direction opposite to the feed direction is imposed on workpiece movement resulting from the continuous feed as the workpiece oscillates in either direction away from its center position, and workpiece movement in the feed direction is imposed on the movement in the feed direction resulting from the feed as the workpiece oscillates towards its center position.

In preferred embodiments which include both features, the workpiece motion in synchronization with oscillation is provided by a two-bar linkage. One end of one bar is fixed relative to, and pivots with the workpiece. The upper end of the other bar is pivotally attached to a support above the workpiece, and the upper end of the one bar and the lower end of the other bar are pivotally connected to each other. The ratio of the length L1 of the one bar to the length L2 of the other bar depends on the size of the workpiece and angle of oscillation of the workpiece, and generally is in the range of about 2:1 to about 4:1.

DETAILED DESCRIPTION

It has been found that the surface tension causing wafers to be drawn together during slicing can be eliminated by insuring that liquid is present between the wafers during cutting. As shown in FIG. 1, that this can be by achieved by forcing the workpiece down through the wire blades (rather than upwardly against the wire blades as in the aforementioned patent), and by maintaining sufficient liquid flow over the cut region to insure that liquid is present between the wafers. Typically, this is provided by submerging the workpiece in a liquid coolant (e.g., water or oil) bath 4 while it is being it being cut. The presence of liquid prevents wear on the facing side surfaces of the wafers resulting in improved wafer accuracy. Additionally, the liquid acts as a coolant, and the temperature of the liquid bath is controlled to insure temperature changes of less than about 2 degrees C. during cutting. This minimizes thermal expansion which otherwise would affect dimensional accuracy.

Forcing the workpiece down rather than upward has a number of other advantages. For example, it permits the bearing for rocking the crystal workpiece 12 to be mounted above, rather than below, the cutting wires 14, which minimizes their exposure to water or other liquid flow and to the swarf that tended to foul the bearings, degrading their function and shortening their useful life.

It has also been found that the rocking procedure of the prior patent, i.e., rocking the crystal about its center to produce the desired radial profile, produced certain difficulties. In particular, rocking of the workpiece results in the point of contact between the workpiece and the blade to move towards and away from the blade. For example, when, as in the prior patents, the crystal workpiece is located below the blades, the point at which the blades engage the workpiece is at a low point when the workpiece is in its center position, the point of contact moves up as the crystal rocks in either direction away from the center (because the radius from the center of the crystal to the cut profile is much smaller than the radius of the cut profile R), and the contact point then moves down as the crystal rocks back to the center of the cut profile. This requires the feed mechanism to oscillate up and down if it is to maintain the desired contact between the blades and the workpiece. The feed mechanism, in synchronization with the workpiece rocking, must alternately move upwardly to maintain the desired contact between the workpiece and the blades, and then downwardly to maintain this contact and to prevent the force between the blades and the workpiece to vary.

The prior systems sought to provided the required movement of the feed mechanism up and down in coordination with the rocking motion by applying a constant force to the feed mechanism. It was found, however, that there was significant variation in the actual cutting force as the feed mechanism moved up or down, particularly due to hysteresis forces on reversals. Measurements were made between the workpiece and wire to determine the force variation. These measurements confirmed that the largest forces occur during the reversals. They also showed that larger forces are encountered during the portion of the rocking cycle in which the workpiece rocked away from its center position and forced the feed mechanism to move contrary to the feed direction (e.g., forced the feed mechanism to move away from the blades) to maintain constant contact, than during the portion of the cycle in which the crystal workpiece rocks towards its center position and maintaining constant force between the workpiece and blades required the feed mechanism to move towards the blades. A counterbalanced weight system was more effective in minimizing force variation due to the oscillating motion, but significant force variations remained.

As previously mentioned, to achieve optimum slicing it is important to maintain a constant feed force. It is also desirable to provide a system in which such a constant feed force can be obtained simply by advancing the workpiece towards the blades at an essentially fixed or constant feed rate that depends only on the cutting rate. This is made extremely difficult, if not effectively impossible, when the feed mechanism also must be continuously cycled up and down to maintain the desired contact between the workpiece and blades.

It has now been found that it is possible to achieve the desired radial cut profile, to achieve an essentially constant force between the workpiece and blades in conjunction with a fixed feed rate, and to eliminate the necessity of continuously cycling the feed mechanism up and down. As shown somewhat schematically in FIGS. 2 and 3, this result is obtained by moving the workpiece vertically in coordination with the rocking, while simultaneously having a fixed feed rate superimposed on this motion.

Figure 2:
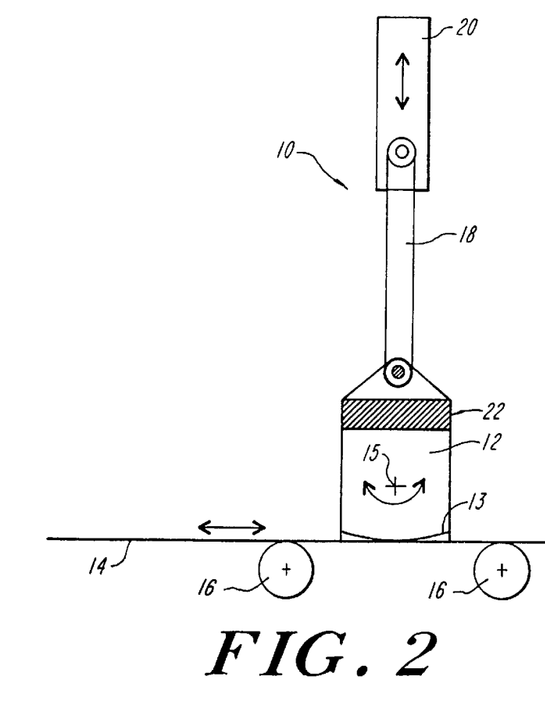
FIGS. 2 and 3 are schematics illustrating the present invention.
Figure 3:
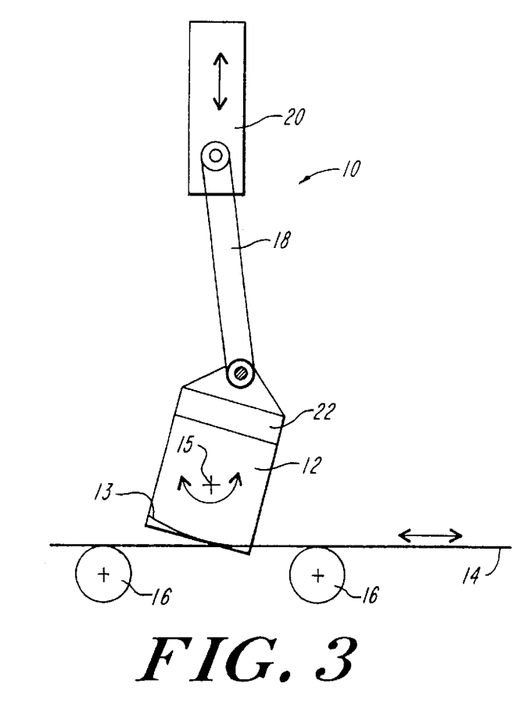

As shown in FIGS. 2 and 3, a crystal slicer vertical feed system, generally designed 10, controls the manner at which a crystal 12, supported by the feed system 10, is lowered through a set of horizontally reciprocating fine wire saw blades 14. In the same manner as is disclosed in detail in the aforementioned patent, the wire blades 14 are clamped to opposite ends of a rectangular frame (not shown) which provides both reciprocating motion and precise spacing between the wire blades. As also described in the aforementioned patent, guide rollers 16 are mounted on each side of the crystal workpiece 12. The guide rollers are slotted with a plurality of circumferential grooves, each of which receives and supports a respective saw blade 14.

The vertical feed system 10 includes a link 18, one end of which is pivotally connected to a vertically movable feed driver 20 and the other of which is pivotally connected to the mounting block 22 to which the crystal workpiece 12 is attached. One drive motor (not shown in FIGS. 2 and 3 but designated 100 in FIG. 4) advances feed driver 20 downwardly at a controlled feed rate. The feed rate, i.e., the rate at which the feed motor moves the workpiece 12 downwardly towards the saw blades 14, is coordinated with the rate at which material is removed. Typically, the feed rate is continuous and constant; alternatively, the feed motor advances feed driver downwardly in discrete steps at regular intervals.

A second motor (also not shown in FIGS. 2 and 3 but designated 110 in FIGS. 4 and 5) oscillates the workpiece in opposite directions about a center of rocking 15 at a rate of about one rocking cycle every 10 seconds, as the workpiece is being advanced downwardly towards the cutting wire 14 by the feed motor. As is apparent from FIG. 3, as the crystal 12 oscillates moves away from center, link 18 (which is pivotally connected to mounting block 22 above center of rocking 15) also pivots. This pivoting causes the mounting block 22 and attached crystal workpiece to move vertically a small distance upwardly. This vertical motion modifies the path of the wire saw blades 14 through the crystal workpiece 12 in such a way that the portions of crystal cut profile 13 and blades 14 that are in contact will change, reducing the contact length B between the wire blade and the workpiece and maintaining a substantially constant force between the workpiece and the blades. It has been found that this lift-and-rock action provided by the link provides the desired radial cut profile, maintains high uniform pressure between the diamond abrasive on the blades the and workpiece, and results in a high precision cut.

Figure 4:
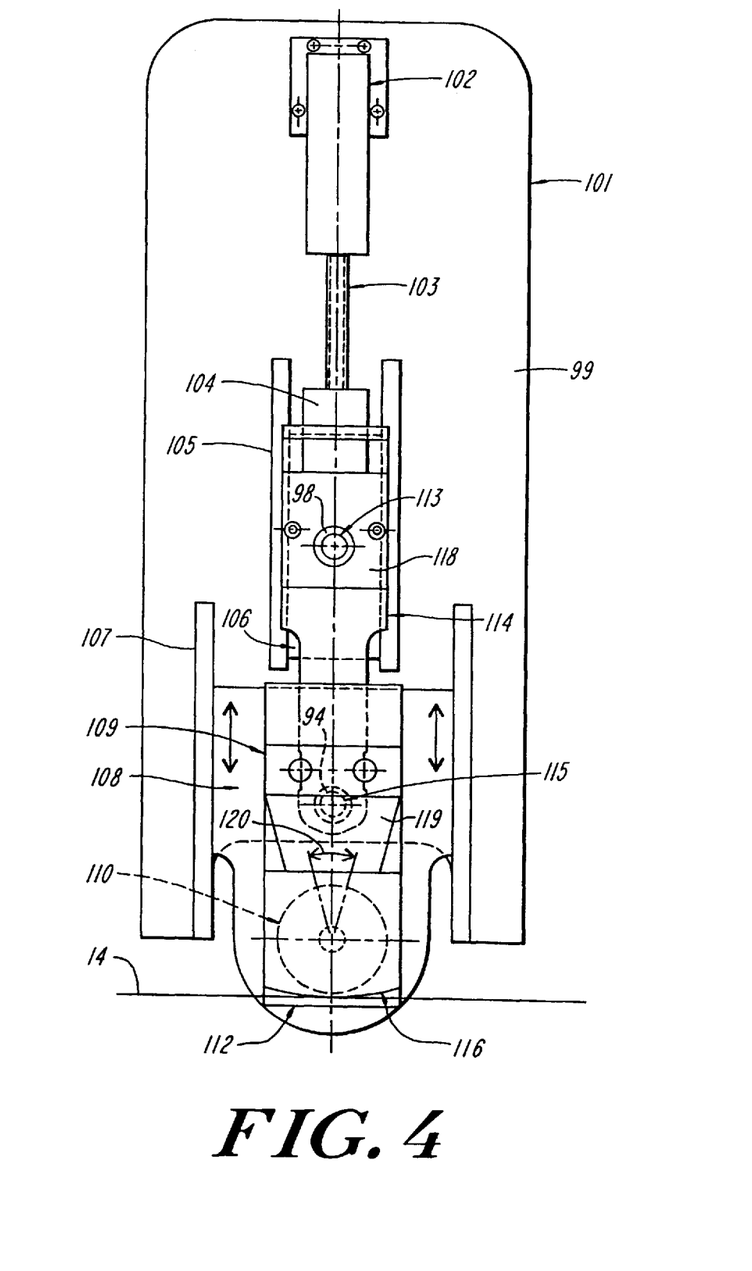
FIG. 4 is a more detailed plan view of a system embody­ing the present invention.
Figure 5:
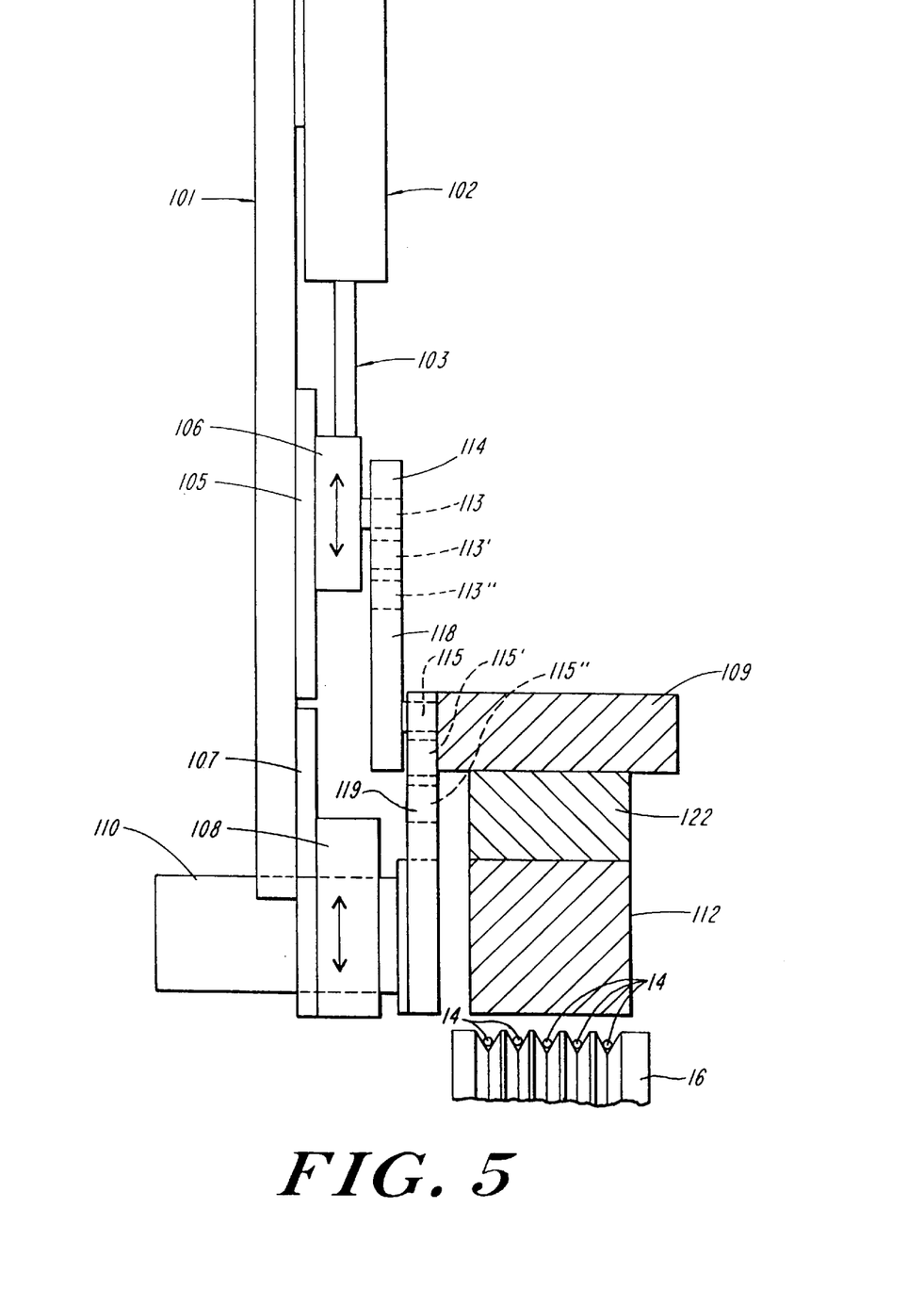
FIG. 5 is a side view of a portion of the system of FIG. 4.

FIGS. 4 and 5 show the vertical feed system 10 in more detail.

A base plate 101 is mounted precisely vertically with its mounting face 99 parallel to the saw blade(s) 14. Feed drive motor 102 is mounted on the vertical face 99 of base plate 101 with the axis of its rotary output vertical. The motor 102 drives a vertical ball screw that is positioned within, and engages a ball nut attached to the inside of, a non-rotating feed tube 103.

Also attached directly to face 99 of base plate 101 are two sets of vertical guide rails, designated 105 and 107 respectively. A pivot pin support plate 106 is mounted for vertical movement on the guide rails 105, parallel to base plate 101. The opposite vertical side edges of the pivot pin support plate 106 each engage a respective guide rail 105, which insures precise linear vertical motion of the support plate 106 relative to the base plate 101. The upper edge of pivot pin support plate 106 is attached to the lower end of feed tube 103 by bracket 104. It will thus be appreciated that rotation of the output of feed drive motor 102 causes pin support plate 106 to move upwardly or downwardly, depending on the direction of rotation, along guide rails 105. A motor mounting plate 108 is similarly mounted on guide rails 107, which provide similar precise, linear vertical motion of the motor mounting plate 108 relative to base plate 101.

Pivot pin support plate 106 and motor mount plate 108 are connected to each other by a connecting link assembly 114 including an upper link 118 pivotally connected to a lower link 119. A pivot pin 113 carried by pivot pin support plate 106 projects forwardly of support plate 106 and engages a bearing 98 at the upper end of upper connecting link 118 of link assembly 114. A second pivot pin 115, carried by the lower portion of link 118, projects forwardly of link 118 and engages a bearing 94 in the upper end of lower link 119. The lower end of lower link 119 is fixed to the output shaft of motor 110.

As shown in FIG. 5, lower link 119 is essentially "L" shaped. A forward projecting portion 109 at the top of link 119 is connected to the mounting block 122 to which the crystal workpiece 112 is attached.

Crystal drive motor 110 is attached to the rear of motor mount plate 108. The body of motor 110 extends behind the motor mount plate, and through a clearance area in base plate 101. The rotary output shaft 94 of crystal drive motor 110 extends forward of the front of the motor mount plate 108 and is fixed to the lower end of link 119.

Figure 6:
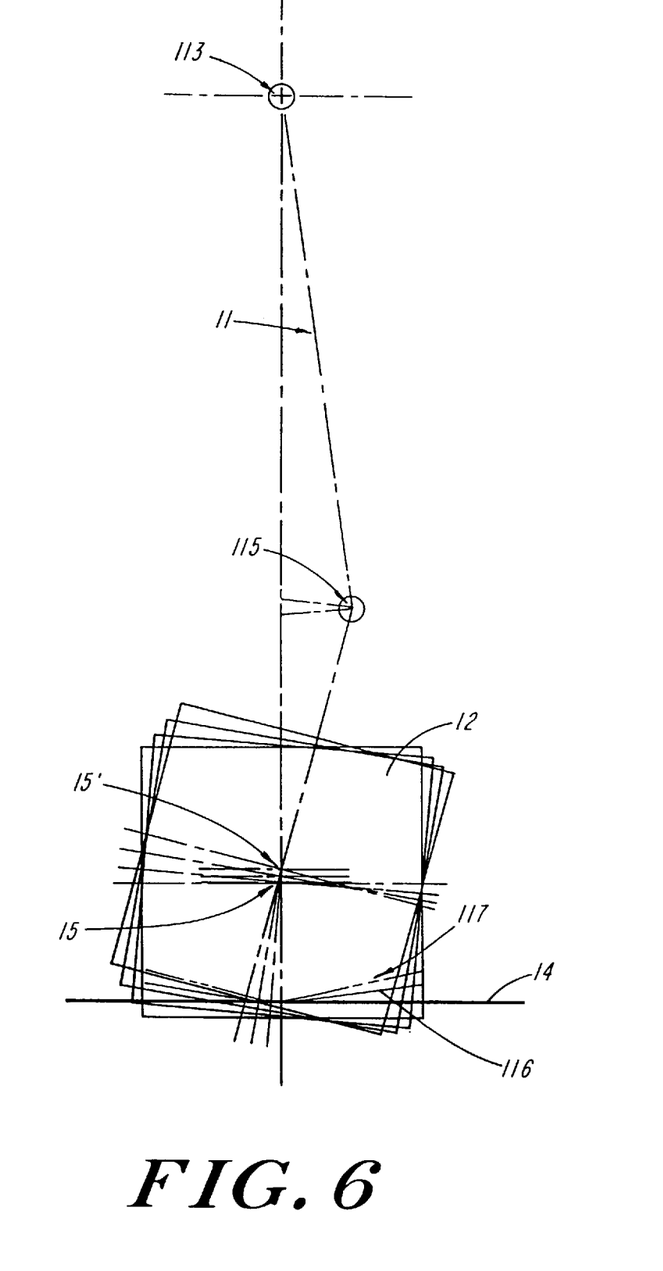
FIG. 6 is a schematic illustrating an aspect of the present invention.

It will be apparent that the pivot pin 115 pivotally connecting the lower end of link 118 to the upper end of link 119 lies between the pivot pin 113 at the upper end of the link assembly and the point at which the output shaft of crystal drive motor 110 is connected to the lower link (which is turn is connected to the crystal support assembly 122). In operation, the output of crystal drive motor 110 oscillates +/−15 degrees. As indicated above and as shown in FIGS. 3 and 6, this oscillation causes lower link 119 of linkage assembly 114 to pivot, which in turn shortens the distance between the axes of pin 115 and motor shaft 94, resulting in vertical movement of mounting block 122 and the crystal workpiece 112 attached to it. As shown in FIG. 6, the workpiece moves between a lower position in which the center of rocking is positioned where indicated by 15, and an upper position in which the center of rocking is positioned where indicated by 15'.

The amount of vertical movement, and the resulting radial profile, depend on the effective lengths of the links 118 and 119 of link assembly 114, which lengths can be varied. In the embodiments shown, the effective length of upper link 118 depends on the point at which pin 113 is connected to the upper end of link 118; the effective length can be shortened by making the connection at the points indicated by dashed lines at, e.g., 113' and 113". Similarly, the effective length of lower link 119 depends on the point at which it is connected to pin 115, and the effective length can be shortened by making the connection at the points shown as, e.g., 115' and 115".

Reference is now made to FIG. 6 which, somewhat schematically, illustrates the movement of crystal workpiece 112 caused by link assembly 114 in response to oscillation of motor 110. In FIG. 6, and also in FIG. 4, line 116 describes the desired path of a wire saw blade 14 as it slices the workpiece 12. This continuously curved path maintains a uniform length of the wire saw in contact with the crystal and thus a uniform cutting pressure is applied against the crystal surface.

Line 117 indicates the path that would be presented to the wire saw blade 14 if the crystal workpiece 114 were simply oscillated during cutting, but without any of the lifting motion provided by linkage 114. Line 117, as will be appreciated, is simply a central 30 degree circular arc (the extent of the arc being determined by the +/−15 degree oscillation and the radius of the arc being determined by the distance from the axis of the output shaft of motor 110 to the point of contact of the crystal workpiece with the saw blade 14) between a pair of straight line portions extending from the opposite ends of the arc to the sides of the workpiece. As discussed above, such a circular arc presents a high pressure to the saw resulting from the short contact length around the small radius and thus a fast cutting action. However, the arc forms only the central portion of the cutting profile. At the end of each oscillation, i.e., when the crystal workpiece has been oscillated 15 degrees to one side or the other, the wire saw blade 14 is in contact with a long saw with a long straight contact length. This period of contact is very short, and the cutting pressure is low, with the result that minimum cutting is accomplished. The saw cannot maintain a cutting path having this shape, and a continuously variable cutting path results. The loss of saw stability so produced results in unusable product.

The desired cutting path is that illustrated by line 116; and it can be achieved and maintained by the combination of oscillation provided by motor 110 with the lifting action provided by linkage 114. It will be evident that, in cutting a workpiece 12, rate at which motor 108 moves the workpiece downwardly towards the saw blades 14 is coordinated with the rate at which material is removed.

For example, the previously described embodiment provides oscillation having a 30 degree included angle and can accommodate workpieces ranging in size from 2×2 inches (50×50 mm) to 6×6 inches (152×152 mm) in cross section. The optimum effective linkage lengths will vary depending on the size of the crystal (and also on the oscillation angle), and can be determined iteratively. In the previously described system, the effective lengths of the links 118, 119 can be varied to provide three linkage ratios, for small (2 in. by 2 in.), medium (4 in. by 4 in.) and large (6 in. by 6 in.) workpieces, respectively, as shown in the following Table. In the Table, L1 is the effective length of link 119, i.e., the distance (in inches) from the axis of the drive shaft of motor 110 to the axis of pin 115 at the lower end of linkage assembly 114, L2 is the effective length of link 118, i.e., the distance (again in inches) between the axes of pins 113 and 115, the "Ratio" is the ratio of L2 to L1, and the radius R is, as shown in FIG. 1, the radius of the cut profile. VD is the vertical displacement (in inches) of the workpiece (which is the same as the vertical displacement of pin 115 from its lowest position when the workpiece is vertical to its highest position when the workpiece is oscillated all the way to the right or left) caused by oscillating the workpiece 15 degrees to either side of center using a linkage having the indicated L1, L2 and Ratio. It will be noted that the radius R is about 2 inches greater than the major effective dimension (width of a rectangular workpiece or diameter of a circular workpiece) of the material being cut.

TABLE

| Size | L1 | L2 | Ratio | Radius R | Vertical Displacement VD |
|---|---|---|---|---|---|
| Small | 2.625 | 9.125 | 3.47:1 | 4.0 | 0.115 |
| Medium | 3.260 | 8.493 | 2.6:1 | 6.0 | 0.153 |
| Large | 3.978 | 7/766 | 1.95:1 | 8.0 | 0.204 |

Figure 7:
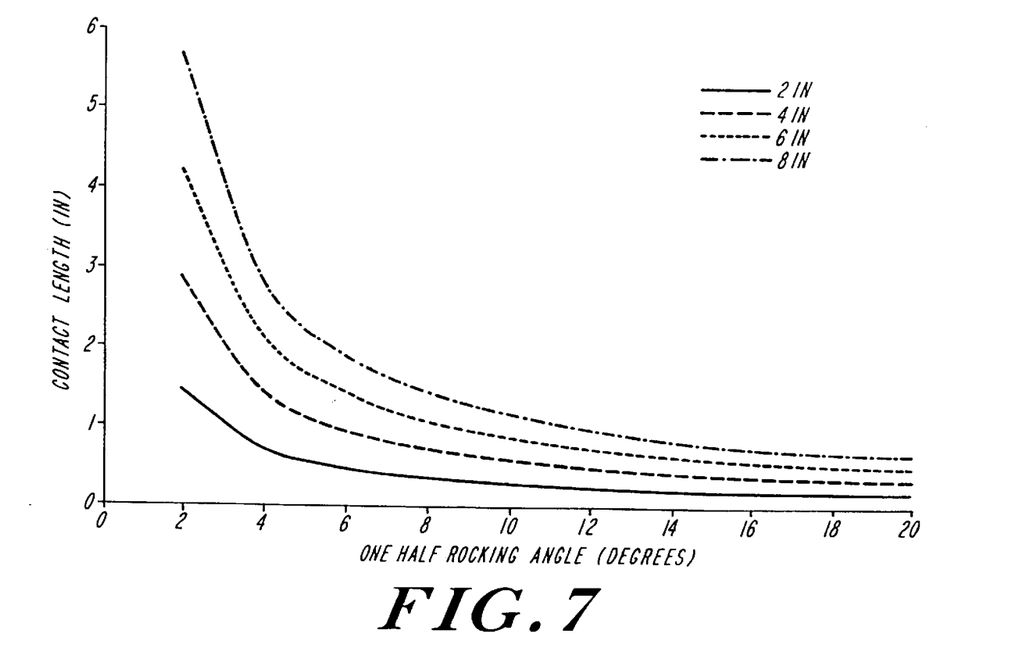
FIG. 7 illustrates the relationship between the contact length between a blade and the workpiece and the angle through which the workpiece is rocked.

FIG. 7 graphically illustrates the manner in which the contact length B varies with the rocking angle of the workpiece, for four sizes of rectangular workpieces. The data presented in FIG. 7 was obtained using a constant feed, wire diameter, guide roller spacing and wire tension. As shown, the contact length B decreases rapidly as the rocking angle increases to a total of about 10 degrees (half rocking angle of about 5 degrees), and then continues to decrease as the rocking angle is further increased. It will also be noted that the decrease in contact length with increased rocking becomes relatively small as the rocking angle is increased over about 30 degrees.

OTHER EMBODIMENTS

In the above-discussed embodiment, the effective length of the links 118 and 119 is varied simply by inserting the respective pivot pins in different holes in the links. Changes in effective length may also be provided by mounting the bearings which engage the ends of the links on pads which are themselves adjustably fastened to the respective links. Such pads may provide for a large number of predetermined positions, or may the pads may be mounted on slide assemblies so that an infinitely variable combination of linkage ratios and workpiece sizes can be accommodated.

In the previously described embodiment, the up-and-down vertical movement of the workpiece in synchronization with the workpiece oscillation is provided by a mechanical linkage. In other embodiments, the linkage may be omitted and this synchronized vertical movement may be provided by coordinating the feed motor 100 that controls vertical motion with the motor 110 that controls workpiece rocking. In such circumstances, the motor 110 may be carried by the support plate 106, and the synchronized vertical movement superposed on the feed rate using stepping motors that are maintained in coordination by suitable software.

Typically, and with either type of embodiment, the basic feed rate to maintain a constant removal rate is constant for workpieces with a rectangular cross-section, and is varied according to the changing cross-section for round crystals.

In all of these embodiments, the system of the present invention produces a radial cut profile while cutting a workpiece at a controllable in-feed rate. The invention, thus, can be used in a wide range of cutting applications to improve cutting performance, including board banksaw, mechanical hacksaw, multiwire slurry saw, or any type of sawing operation in which a long contact length decreases slicing performance by minimizing to the pressure between the saw teeth and the workpiece. In systems using large workpieces, both sides (rather than only one side as shown in FIG. 5) of the workpiece may be supported, e.g., by pivotally attaching the other side of the workpiece to a second slide assembly similar to rails 107 and motor support block 108.

These and other embodiments will be within the scope of the following claims.

What is claimed is:

1. A cutting machine comprising
   a longitudinally-extending blade mounted for movement generally parallel to the axis thereof;
   a workpiece holder mounted above said blade and arranged to move a workpiece supported by said workpiece holder downwardly towards and into cutting contact with a longitudinally extending portion of said blade, said downward movement being along a movement axis generally perpendicular to the direction of movement of the cutting blade;
   an oscillator arranged to oscillate the workpiece holder and a workpiece supported by said workpiece holder about an oscillation axis that is generally perpendicular both to said direction of reciprocating movement of the cutting blade and to the movement axis of the workpiece holder; and;
   a workpiece mover arranged to move said workpiece towards and away from said blade in synchronization with oscillation of said workpiece by said oscillator.

2. The machine of claim 1 including:
   a workpiece support assembly including a support plate mounting said workpiece holder for movement along said movement axis relative to said support; and
   a linkage having one end portion thereof pivotally attached to said workpiece support assembly and a second end portion thereof fixed relative to said workpiece holder such that said oscillation of said workpiece holder causes said linkage to move said workpiece holder vertically relative to said support.

3. A cutting machine comprising:
   a longitudinally-extending blade mounted for movement generally parallel to the axis thereof;
   a workpiece holder mounted above said blade and arranged to move a workpiece supported by said workpiece holder downwardly towards and into cutting contact with a longitudinally extending portion of said blade, said downward movement being along a movement axis generally perpendicular to the direction of movement of the cutting blade;
   an oscillator arranged to oscillate the workpiece holder and a workpiece supported by said workpiece holder about an oscillation axis that is generally perpendicular both to said direction of reciprocating movement of the cutting blade and to the movement axis of the workpiece holder;

a workpiece support assembly including a support plate mounting said workpiece holder for movement along said movement axis relative to said support; and a linkage having one end portion thereof pivotally attached to said workpiece support assembly and a second end portion thereof fixed relative to said workpiece holder such that said oscillation of said workpiece holder causes said linkage to move said workpiece holder vertically relative to said support, said linkage comprising two links pivotally connected to each other, the upper end of one of said links defining said first end of said linkage assembly and the lower end of the other of said links defining said second end of said linkage assembly.

4. The machine of claim 3 wherein the length of said one link is L1, the length of said other link is L2, and the ratio of L1 to L2 is in the range of about 2 to 4.

5. The machine of claim 3 wherein said workpiece oscillates through an included angle in the range of not less than about 10 to not more than about 40 degrees.

6. The machine of claim 5 wherein said angle is about thirty degrees.

7. The machine of claim 1 including rollers mounted on opposite sides of said workpiece holder for rotation about axes perpendicular to the direction of movement of said wire blade, each of said rollers having a circumferential groove aligned with and receiving said blade, said rollers decreasing the unsupported length of said blade to decrease the contact length of said blade on said workpiece and reduce transverse wander of the wire blade.

8. The machine of claim 1 including means for introducing liquid into the region of said workpiece in contact with and adjacent said blade.

9. A cutting machine comprising a longitudinally-extending blade mounted for movement generally parallel to the axis thereof;

a workpiece holder mounted above said blade and arranged to move a workpiece supported by said workpiece holder downwardly towards and into cutting contact with a longitudinally extending portion of said blade, said downward movement being along a movement axis generally perpendicular to the direction of movement of the cutting blade;

an oscillator arranged to oscillate the workpiece holder and a workpiece supported by said workpiece holder about an oscillation axis that is generally perpendicular both to said direction of reciprocating movement of the cutting blade and to the movement axis of the workpiece holder; and a vertical mover arranged to superimpose on said downward movement a vertical up-and-down movement coordinated with the oscillating of the workpiece, the coordinated movement moving said workpiece upwardly as said workpiece is oscillated away from a central position and moving said workpiece downwardly as said workpiece is oscillated towards said central position.

10. The machine of claim 1 wherein aid blade is a reciprocating blade.

11. The machine of claim 10 wherein said blade is a wire blade.

12. In the method of cutting a workpiece comprising providing a moving blade, mounting the workpiece in a workpiece holder, biasing the workpiece holder and blade relatively towards each other along a movement axis generally perpendicular to the direction of movement of the blade, and oscillating the workpiece holder about a rocking axis perpendicular to both the movement axis an the direction of movement, that improvement comprising:

providing a first movement of said workpiece holder and said workpiece mounted therein towards said blade;

providing a second movement of said workpiece towards and away from said blade in synchronization with the oscillation of said workpiece, said second movement (i) moving said workpiece in a direct on opposite to said first movement during oscillation of said workpiece holder away from a central position thereof, and (ii) moving said workpiece in the direction of said first movement during oscillation of said workpiece holder towards said central position thereof, such that a substantially constant length of said blade remains in contact with said workpiece during said oscillation and said second movement.

13. In the method of cutting a workpiece comprising, providing a moving blade, mounting the workpiece in a workpiece holder, biasing the workpiece holder and blade relatively towards each other along a movement axis generally perpendicular to the direction of movement of the blade, and oscillating the workpiece holder about a rocking axis perpendicular to both the movement axis and the direction of movement, that improvement comprising:

providing a first movement of said workpiece holder and said workpiece mounted therein towards said blade; and providing a second movement of said workpiece towards and away from said blade in synchronization with the oscillation of said workpiece.

* * * * *